Oct. 7, 1969   R. GOETGHELUCK   3,471,601
PROCESS FOR THE MANUFACTURE OF ARTICLES FROM PLASTICS
MATERIAL OR HAVING AT LEAST ONE PLASTIC STATE
Filed July 30, 1965   6 Sheets-Sheet 1
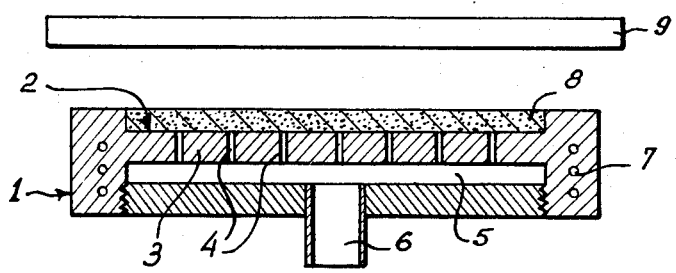
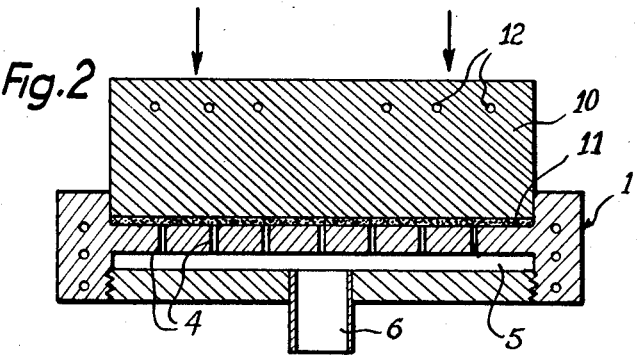
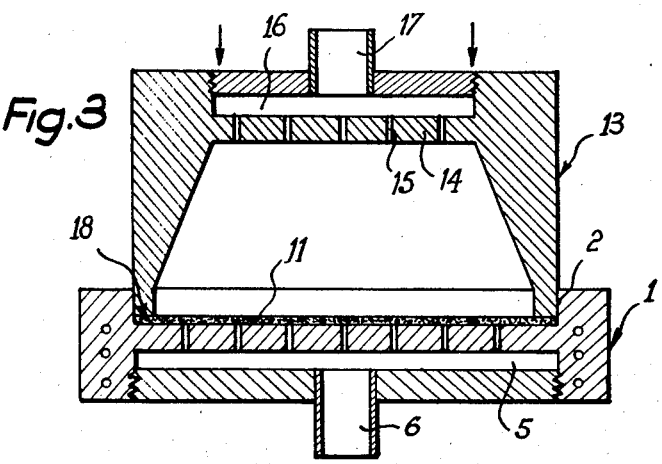

3,471,601
PROCESS FOR THE MANUFACTURE OF ARTICLES FROM PLASTICS MATERIAL OR HAVING AT LEAST ONE PLASTIC STATE
Rémi Goetgheluck, Steenvoorde, Nord, France, assignor to Societe Civile dite N.G.T., Bagneux, France
Filed July 30, 1965, Ser. No. 476,002
Claims priority, application France, Aug. 7, 1964, 984,496
Int. Cl. B29c 17/04; B29g 1/00; B29c 3/00
U.S. Cl. 264—93                         6 Claims

ABSTRACT OF THE DISCLOSURE

This disclosure relates to a process for the manufacture of articles from plastic material for having at least one plastic state. An article of plastic material is manufactured by introducing into a shallow blank mold a starting material in a quantity exactly equal to that required for a finished article, subjecting the starting material to a uniform heating and cooling treatment to bring it to plasticization temperature, compressing the plasticized material in such a manner as to obtain a homogeneous blank in the form of a thin sheet, covering the blank with a forming mold so as to keep the edge of the blank rigidly fixed between the blank mold and the forming mold, introducing a pressure differential between the interior and exterior of the forming mold in such a way as to deform the blank to correspond to the internal shape of the forming mold, separating the two molds, and ejecting the finished article from the molds after appropriate cooling.

BACKGROUND OF THE INVENTION

Many different processes are already known for the manufacture of articles from plastics material, such as the processes comprising compression moulding and transfer moulding of the plastics material, the processes in which the plastics material is injection-moulded and the processes in which forming is effected by suction and/or blowing, by stamping, etc.

Generally speaking, these known processes require a considerable amount of equipment for controlling the temperature distribution in the plastics material. They make use of a mechanical and thermal assembly acting on a heterogeneous mass of plastics material for stirring it mechanically and for ensuring, in the best possible manner, the desired heat distribution. Since the heating of the plastics material is a function of the heat conductivity and of the quantity of plastics material, the treatment of this latter has to be carried out fairly slowly, causing relatively low productivity yields for the equipment which is used. In addition, gases are very frequently retained in the plasticised mass and the degasifying systems have only a poor efficiency especially in involving compression and transfer moulding processes.

The known processes involve substantial losses of material, arising for example from the cores, the locking plates, the material squeezed out on closing the moulds, etc. The resulting lost material very frequently cannot be re-transformed and used again, particularly in the case of plastic materials with which there is an irreversible transformation cycle. Moreover, the articles obtained by these processes frequently necessitate a supplementary machining.

The known processes in which a sheet of plastic material is formed by suction and/or blowing do not enable the final thickness of the walls of the manufactured article to be sufficiently controlled. In order to obtain a predetermined wall thickness at a specific point of the article when using such a forming process, it is practically impossible to reduce the thickness of the walls at the places where, from a technical point of view, it would be pointless to have excessive thickness. Although the injection moulding processes enable the thickness of the walls to be controlled, they can only be applied with difficulty to the manufacture of articles having thin walls. In addition, the articles thus produced are very fragile, due to the lack of molecular orientation.

SUMMARY OF THE INVENTION

According to the present invention there is provided a process for the manufacture of an article of plastics material, such process comprising the steps of introducing a starting material in a quantity exactly equal to that constituting the finished article into a shallow blank mould; subjecting the starting material to a uniform heating or cooling treatment to bring it quickly to the plasticisation temperature; compressing the plasticised material in such a manner as to obtain a homogeneous blank in the form of a thin sheet; covering the blank with a forming mould in such a way as to keep the edge of the blank fixed between the blank mould and the forming mould; establishing a positive pressure differential between the interior and exterior of the forming mould in such a way as to apply the blank to the internal walls of the forming mould; separating the two moulds; cooling the finished article, and ejecting the latter from the moulds.

The process of the present invention obviates all the aforesaid disadvantages, and in particular permits economical, rapid and simple manufacture of the article, and especially a good distribution of the heat through the thermoplastic composition, an efficient degasifying, the elimination of losses of material, the accurate control of the wall thicknesses at each point of the manufactured element, a good molecular orientation of the material and the simultaneous use of several different materials, of which one may be a material which is not thermoplastic.

Prior to covering the blank with the forming mould another starting material may be deposited at least once on the blank previously obtained, the said other material being subjected to a heating or cooling treatment and being compressed in such a way as to obtain a complex blank formed by superimposed layers of materials which have different physical and chemical properties.

If desired, the blank mould may be filled with several different initial materials in superimposed layers which are subjected to a heating or cooling treatment, and the assembly of layers is compressed, with or without previous heating or cooling and compression of the different layers deposited in the blank mould.

Advantageously, the blank is given local increased thicknesses at certain points so as to obtain a finished article of which the walls either strictly have the same thickness everywhere, or different thicknesses and particularly a small thickness and an excessive thickness at certain positions on the finished article where, from a technical point of view, this small thickness or excessive thickness are desired.

In certain circumstances located elements or decorative materials may be deposited on the upper face of the blank, which face forms the external wall of the finished article, or between two layers of a complex blank, so that after the finished article has been formed, there is obtained an inscription or decoration flush with the external wall of the finished article or covered by a transparent layer of the complex blank.

According to another aspect, the invention provides apparatus enabling the process to be carried into effect such apparatus comprising a movable support provided with a series of blank moulds capable of being connected alternately and successively to a compressed air source or to a vacuum pump; a charging station situated above the movable support and in such a way as to ensure a correct filling of each blank mould with at least one starting material; a heating unit disposed above the movable support and the path of the blank moulds; a compression station for the heated starting material permitting a blank to be formed, which station is situated above the path of the blank moulds; a station comprising forming moulds, means for introducing a forming mould into the blank mould and maintaining it therein during the operation of forming the blank, means for creating of positive pressure differential in said moulds, means for lifting the forming mould from the blank mould and means for ejecting the cooled finished articles from the forming mould.

According to a preferred feature, the heating unit comprises several parts, which are interposed between the charging and compression stations.

Advantageously, the support of the blank moulds is keyed on a rotatable vertical shaft and the forming moulds are mounted in a rotatable support which is also keyed on a vertical shaft, the forming moulds having a certain free vertical travel in their support and being urged out of the blank moulds by means of a return spring. Preferably the vertical shafts of the supports for the blank moulds and forming moulds are arranged in such a way that the paths of the blank moulds and forming moulds are superimposed exactly at a predetermined position.

Advantageously, the compression station comprises a hydraulic or pneumatic punch, the contour of which matches perfectly and in a tight manner the shape of the internal walls of the blank mould. The means enabling the forming mould to be introduced into the blank mould and to be maintained therein may be formed by a hydraulic or pneumatic piston situated above the position where the paths of the forming and blank moulds overlap.

The present invention will be more fully understood from the following description of two embodiments of the process and of one embodiment of the apparatus, given by way of example, reference being made to the accompanying drawings in which:

FIGURE 1 is a diagrammatic section of the heating unit and the blank mould, for use in the method of the invention;

FIGURE 2 is a diagrammatic section of the compression punch and the blank mould of FIGURE 1;

FIGURES 3 and 4 are diagrammatic sections of the forming mould and of the blank mould before and after the forming step;

DESCRIPTION OF PREFERRED EMBODIMENTS

Figure 4:
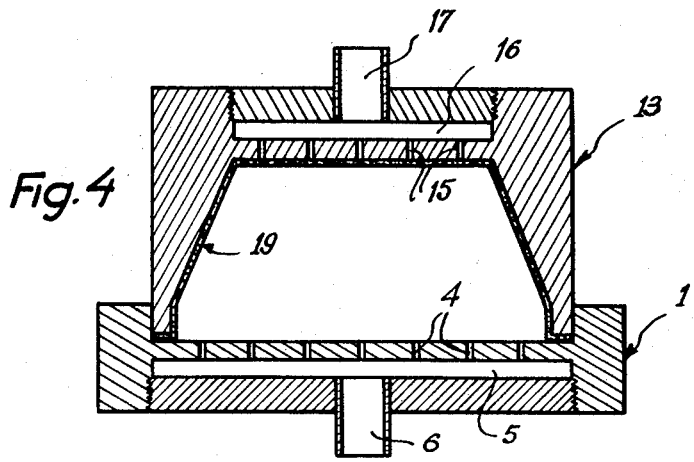

As can be seen in FIGURE 1, the blank mould 1 comprises a circular and flat-bottomed cavity 2, an intermediate layer 3 formed with passages 4 or a layer 3 consisting of gas-pervious material, such as a sintered metal or a porous ceramic, a chamber 5 situated beneath the layer 3 and connected by means of a pipe 6 to a source of gas under pressure or to a vacuum pump. The mould 1 is equipped with temperature control elements 7, such as conduits embedded in the mass forming the blank mould 1 and capable of being supplied with a hot or cold fluid.

The first operating stage in the manufacture of the plastic article, such as a container, consists in introducing the initial material 8, such as thermoplastic materials, into the cavity 2. In general, it is possible to use as initial material any material which can be deformed at a certain temperature. This material may be in the form of liquids, pastes, powders, granules or even a mixture of these latter. The quantity of the initial material 8 is predetermined and is such that it corresponds exactly to that of the material constituting the finished article, so that there are no losses of material arising from a subsequent finishing of the completed article. The volume of the cavity 2 is such that it is only able to receive the predetermined quantity of the initial material 8.

The blank mould 1, filled with the starting material 8, is then positioned beneath a heating unit 9 which for example emits an infra-red radiation. According to requirements, the blank mould 1 is heated or cooled by the control elements 7 and, while it is displaced beneath the said heating unit 9, the starting material 8 is subjected to a heating or cooling treatment to bring it to the plasticisation temperature. By the expression "heating or cooling treatment," is meant a heating or a cooling of the starting material until the plasticisation temperature is reached, or the maintaining of the starting material at the said temperature, because the starting material can be introduced into the mould either at a lower temperature or at a higher temperature or at a temperature equal to the plasticisation temperature thereof.

Due to the fact that the thickness of the layer of starting material 8 is generally small, the plasticisation temperature is reached fairly quickly and can easily be maintained. The gases which possibly form in the starting material 8 during the heating or the polymerisation thereof are able to escape into the atmosphere.

When the plasticisation temperature has been reached, the blank mould 1 is positioned underneath a compression station, having a punch 10, capable of fitting tightly into the cavity 2 of the mould, the punch then compressing the material 8 with a predetermined pressure P to transform it into a homogeneous blank 11. The remaining gas bubbles are able to escape through the passage 4, either under the action of the pressure of the punch 10 alone or under the action of the pressure of this latter in combination with the vacuum produced in the chamber 5 by a vacuum pump connected thereto by means of the pipe 6 when the blank mould 1 is underneath the punch 10 (FIGURE 2).

The punch 10 is also provided with regulating elements 12, such as conduits fed with a hot or cold fluid, so that the homogeneous blank 11 is always maintained at a constant plasticisation temperature.

Thereafter, after having raised the compression punch 10, the blank mould 1 is positioned beneath the forming station which comprises at least one forming mould 13 having the negative form of the finished article which it is desired to produce. The bottom of the forming mould 13 is formed by an intermediate layer 14 having passages 15 or by a layer of porous sintered metal or by a layer of porous ceramic. A chamber 16 disposed above the intermediate layer 14 may be connected by means of a pipe 17 to a vacuum pump or to a source of compressed air. The forming mould 13 has an external contour which fits exactly and tightly in the cavity 2 of the blank mould 1. When the forming mould 13 is applied with a pressure $P_1$ (which is generally lower than the pressure P) to the blank 11, the lower edge 18 of the mould 13 serves as a locking plate and maintains the marginal portion of the blank 11 against the bottom of the cavity 2 (FIGURE 3).

The blank 11 is then deformed and is applied to the internal wall of the forming mould 13 under the effect of a pneumatic excess pressure produced in the chamber 5 of the blank mould 1 and/or of a vacuum produced in the chamber 16 of the forming mould 13. The blank 11 is thus given the shape which it is desired to have for the finished article 19. After removing the forming mould 13 from the blank mould 1, which is carried out while still maintaining a certain vacuum in the chamber 16, and after cooling the finished article 19, this latter is removed from the mould by bringing the chamber 16 to atmospheric pressure or to a slight superatmospheric pressure, so that the finished article 19 falls out or is ejected from the forming mould 13 (FIGURE 4).

Figure 5:
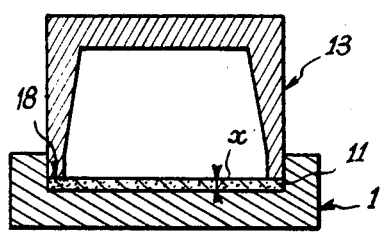
FIGURES 5 to 8 are diagrammatic sections of the forming mould and the blank mould, showing the manufacture of a finished article from blanks, with and without extra thickness.
Figure 6:
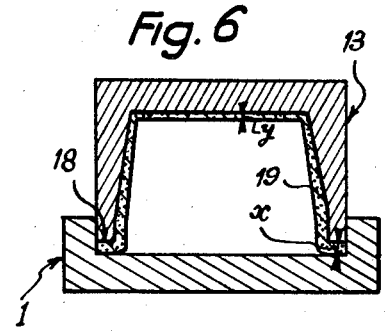

It will be appreciated that the final minimum thickness of a moulded article is a function of the depth of the latter and of the initial thickness of the blank in sheet form. As can be seen from FIGURES 5 and 6, the flat blank 11 of a uniform thickness $x$ gives, after the blank 11 has been moulded, an element 19 of which the walls and the bottom have different thicknesses. In particular, the bottom of the element 19 only has a small thickness $y$, while the rim of the element 19 has maintained its initial thickness $x$.

Figure 7:
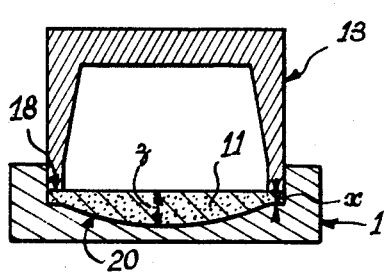
Figure 8:
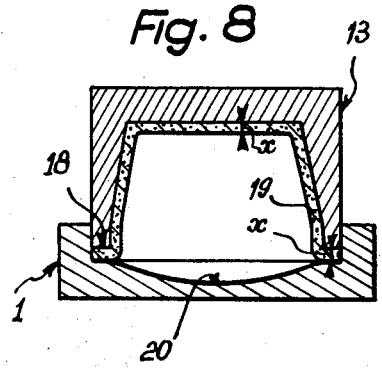
Figure 9:
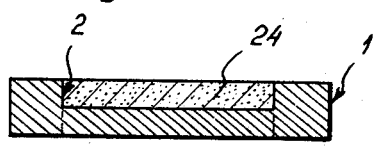
FIGURES 9 to 13 are diagrammatic sections of the blank mould, the compression punch and the forming mould, these sections showing the successive stages in manufacture of a complex blank and of the container.

In order to obtain a uniform thickness of the walls of the finished article 19, it is advantageous to use a blank 11 of which at least one of the faces is concave. In other words, the thickness of the blank 11 varies from one region to another; in this specific case, the blank 11 has in its marginal zone a thickness $x$ which corresponds to the thickness of the walls at the bottom of the finished article and which increases towards the centre of the blank 11, where it has a thickness $z$. Because of the localised extra thicknesses, when such a blank 11 has been moulded by suction and/or by blowing, the finished article 19 has walls of uniform thickness $x$ (FIGURES 7 and 8). By modifying the position and the amount of the extra thickness in the blank, it is also possible to locate in the finished article areas of extra thickness which have any predetermined form.

Such a blank 11 is obtained by providing in the blank mould 1 a recess 20 which is for example of curved form. Instead of providing the recess in the blank mould 1, the recess 20 can also be formed in the lower end of the compression punch 10. In order to simplify the drawings, the air-porous layers 3, 14 and the chambers 5, 16 respectively provided in the blank mould 1 and in the forming mould 13 have not been shown in FIGURES 5 to 13.

Figure 10:
Figure 11:
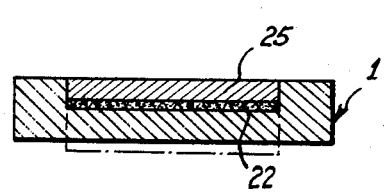
Figure 12:
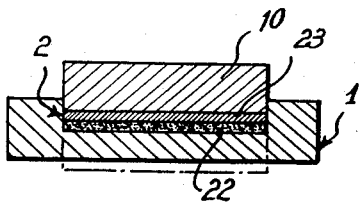
Figure 13:
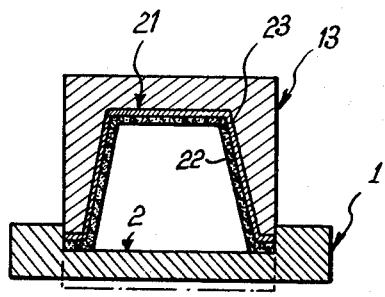
Figure 14:
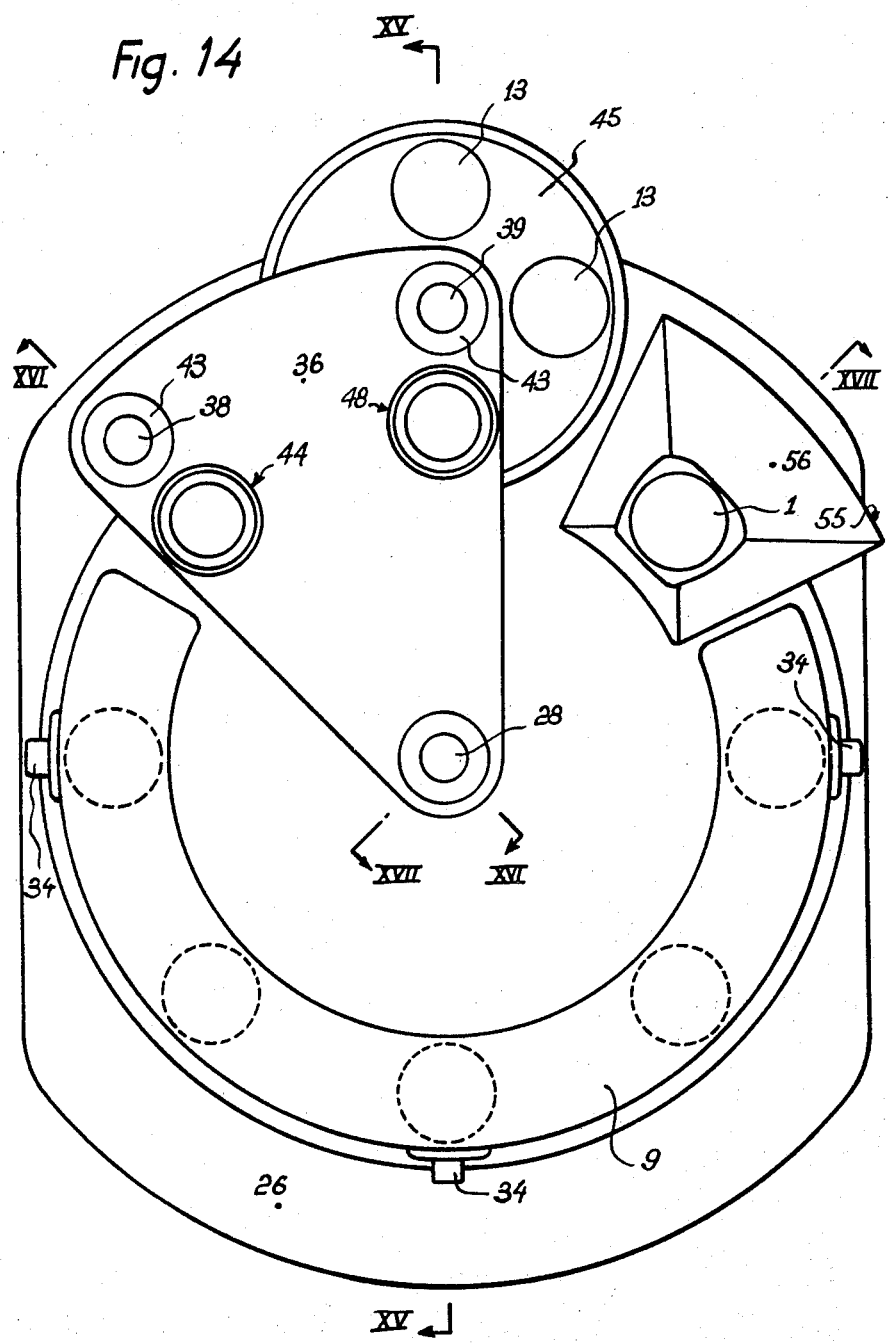
FIGURE 14 is a plan view of the forming installation.
Figure 15:
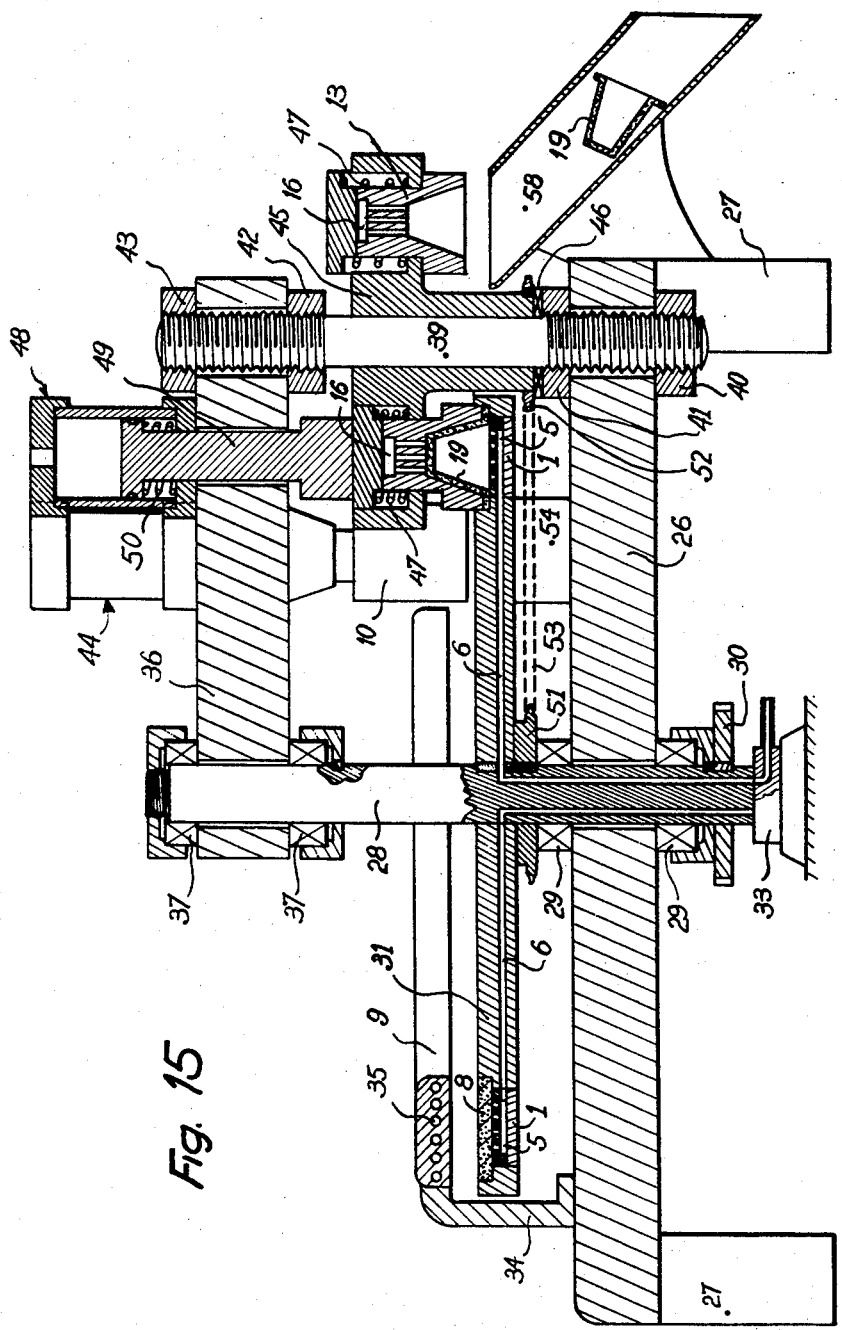
FIGURE 15 is a vertical section on the line XV—XV of FIGURE 14.
Figure 16:
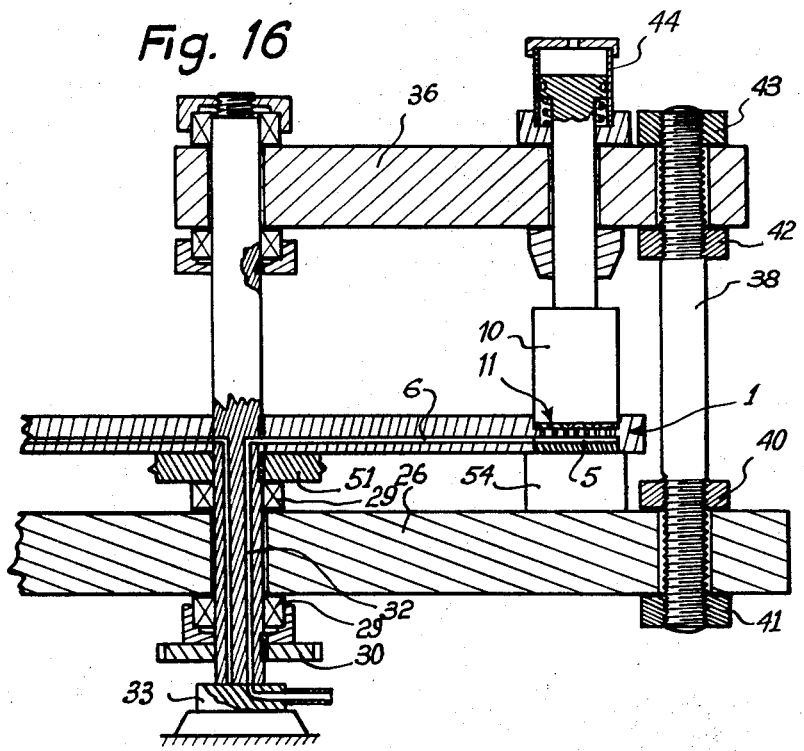
FIGURE 16 is a vertical section on the line XVI—XVI of FIGURE 14.
Figure 17:
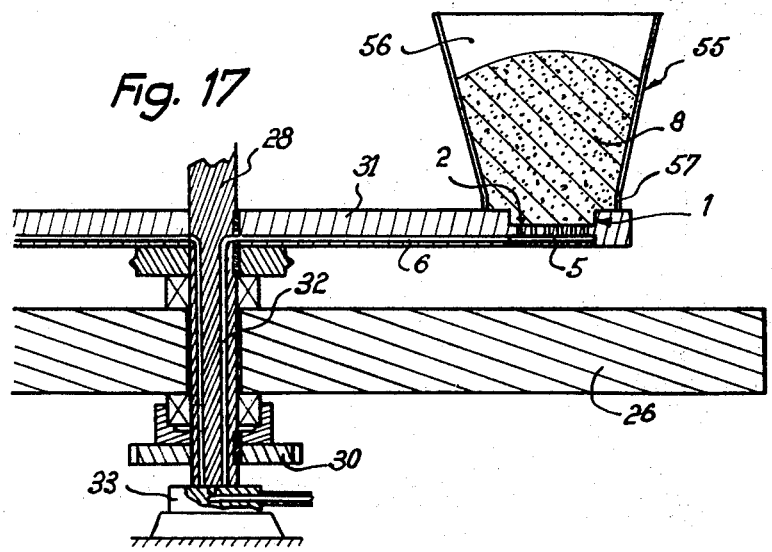
FIGURE 17 is a vertical section on the line XVII—XVII of FIGURE 14.

FIGURES 9 to 13 illustrate diagrammatically one method of manufacturing a finished article 21, of which the walls are formed by two layers 22, 23 of different materials (FIGURE 13). For this purpose, a starting material 24 is introduced into the cavity 2 of the blank mould 1 so as completely to fill the cavity 2. After having been brought to its plasticisation temperature, this starting material 24 is formed into a blank 22 by means of the punch 10 (FIGURE 10). The same cavity 2 is then completely filled with another starting material 25, while leaving the blank 22 in position in the blank mould 1 (FIGURE 11). After heat or cold treatment and compression of the material 25, a second blank 23 is obtained which adheres fast to the first blank 22. There is thus obtained a complex blank 22, 23, of which the component materials may be different from both a physical and chemical point of view. The complex blank 22, 23 is then subjected to forming and demoulding operations and gives a finished article 21, of which the internal wall and the external wall are formed of different materials.

In the case of manufacturing a complex blank, it may be advantageous to make a part of the bottom of the blank mould 1 capable of vertical movement, this part being defined by the vertical walls of the cavity 2 (see chain-dotted lines in FIGURES 9 to 13). Means are also provided which permit the movable bottom of the blank mould to be kept fixed in a position appropriate for the formation of a complex blank.

The preparation of a complex blank is not limited to the example as previously described, since it is possible to modify the number and thickness of the layers of starting materials, as well as the combination of the different working phases, such as filling, heating and compression.

Thus, it is, for example, possible to produce a complex blank by filling the mould with two layers of different starting materials, without previous heating and compression of the first layer of starting material.

It may also be advantageous to deposit on the formed blank and at prescribed regions of the blank, materials which give the finished article a decorative effect or physical properties different from those of the thermoplastic plastics. Thus, powders of any appropriate material can serve to form inscriptions on the blank. It is also possible to use labels which have a seal or a trademark device. Once these powders and labels have been deposited on the plastic blank, they are embedded on the latter, either by means of a punch, or at the time of moulding the article when the blank is applied to the walls of the forming mould. When using a magnetised metallic powder, it would be possible to manufacture for example beakers which, by means of a permanent magnet, could be fixed to walls, sloping shelves, etc. By means of this method of manufacture articles are obtained of which the decorations or inscriptions conform with the external wall of the article.

The apparatus for the preparation of a blank and for moulding this latter, which is illustrated in FIGURES 14 to 17 comprises a frame 26 resting on feet 27 and a central vertical spindle or shaft 28 mounted so as to be freely rotatable on the frame 26 by means of two roller bearings 29 disposed on either side of the frame 26. At its bottom end, the central shaft 28 is provided with a toothed wheel 30 which is driven by a motor, not shown in the drawing.

Keyed on the shaft 28 is a support 31 of disc form, in which are arranged the blank moulds 1, the chambers 5 of which, by means of conduits 6 provided in support 31 and conduits 32 provided in the shaft 28, are connected alternately or successively, according to requirements, to a source of compressed air or to a vacuum pump by means of a distribution disc 33. A heating unit 9, which is for example of annular form and which covers more than half of the circular path of the blank moulds 1, is mounted above the support 31 and is fixed on the frame 26 by means of arms 34. The heating unit 9 is equipped with heating elements 35 which emit, for example, an infra-red radiation. It is obviously advantageous in certain cases to give the heating unit 9 a rectilinear form. Supply and discharge conduits (not shown) are provided in advantageous manner in the support 31 for the supply of the regulating elements 7 of the moulds 1. These conduits communicate in fluid-tight manner with the inlet and outlet of the conduits forming the regulator elements 7 and are capable of being connected to a source of hot or cold fluid of which the temperature can be regulated.

A triangular plate 36 is mounted on the upper end of the shaft 28 by means of two roller bearings 37 suitably fixed on the shaft 28. This plate 36 is also fixed on the frame 26 by means of two vertical rods 38, 39 which are screw-threaded at their ends and secured to the frame 26 by means of nuts 40, 41. The plate 36 is fixed on the two threaded shafts 38, 39 by means of two nuts 42, 43 arranged on either side of the plate 36.

The plate 36 serves as support for a compression station 44 mounted in the immediate vicinity of the outlet end of the heating unit 9. This compression station 44 comprises a double-action pneumatic or hydraulic jack, of which the vertical punch or ram 10 is disposed on the circular path of the blank moulds 1. The contour of the punch or ram 10 is such that it penetrates exactly and tightly into the cavity 2 of the blank mould 1. A counter-support 54 is provided below the support 31 and in alignment with the punch 10.

Loosely mounted on the central non-threaded part of the shaft 39 is a circular support 45 for the forming moulds 13, this support resting on the frame 26 by means of a bearing abutment 46 and the nut 41.

The forming moulds 13 are disposed in the circular support 45 so as to be able to slide vertically in this latter and in such a way that each of these moulds 13 comes successively above one of the blank moulds 1 formed in the support 31. Each forming mould 13 is held by means of a return spring 47 in a position in which it is disengaged from the support 31 and its blank moulds 1, each forming mould 13 having, at its lower end, a contour corresponding exactly to the internal diameter of the cavity of the blank mould 1 so that the forming mould 13 is able to fit tightly into the blank mould 1.

Provided above the location at which the path of the blank moulds 1 and that of the forming moulds 13 are superimposed is a vertical displacement station 48 for the forming moulds 13. This displacement station 48 is also mounted on the plate 36 and comprises a pneumatic or hydraulic jack 49, the bottom end of which can be applied to the forming mould 13 so as to insert the latter into the blank mould 1 and to retain it therein during the operation of moulding the article 19. A return spring 50 urges the jack 49 into a position which enables the return spring 47 to withdraw the forming mould 13 from the blank mould 1.

Keyed on the shaft 28 and on the shaft or spindle 39 are chain wheels or sprockets 51, 52 which are inter-connected by means of a chain 53 in such a way that a blank mould 1 is always exactly in coincidence with a forming mould 13. It is also to be noted that when a blank mould 1 is in alignment with a forming mould 13, the corresponding conduits 32 and 6 of the shaft 28 and of the support 31 are connected to the conduit of the distributor disc 33, which at this moment is connected to a source of compressed air. While the blank moulds 1 are beneath the compression station 44, the chambers 5 of the blank moulds 1 can also be connected by means of the conduits 6, 32 and the distributor disc 33 to a vacuum pump.

A charging station 55 adapted to permit the correct and exact filling of each blank mould 1 is disposed at the inlet end of the heating unit 9 and just above the path of the blank moulds 1.

This charging station 55 comprises a hopper 56 filled with the starting material 8. The lower opening of the hopper 56, such as a slot, has a length greater than the diameter of the cavity 2 of the blank mould 1. Elastic packings 57 which are fast with the hopper 56 and which are applied to the upper face of the support 31 prevent the starting material 8 from going beyond the cavity 2 of the mould 1. Thus, the blank moulds are always filled with an exact predetermined quantity of the starting material 8.

A discharge slope or chute 58 for the finished article 19 is mounted on the frame 26 just beneath the path of the forming moulds 13, in which path these latter are in a rest position.

The different working stages of the process according to the invention will be explained hereinafter by means of the description of one method of operating the above described apparatus.

The blank moulds 1 pass successively underneath the charging station 55, which exactly fills the cavities 2 of the said moulds 1. The moulds 1 are then displaced underneath the heating unit 9, which quickly brings the starting material 8 to its plasticisation temperature. Each blank mould 1 filled with the starting material then passes beneath the compression station 44, where the punch 10 compresses the starting material 8 so as to form a blank 11. During this operation, the chamber 5 of the corresponding mould 1 can be connected to a vacuum pump in order to facilitate the discharge of gas from the blank 11. The blank mould 1 with the blank 11 is then moved beneath the support 45 of the forming moulds 13. When the blank mould 1 and a forming mould 13 are exactly aligned, the drive of the shaft 28 and consequently the drive of the supports 26 and 45 is stopped. The jack 49 introduces the forming mould 13 into the blank mould 1, where the blank 11 is held in position by the lower end of the forming mould 13 being applied to the rim of the blank 11. The chamber 5 of the blank mould 1 is then connected to a source of compressed air or to atmosphere and/or the chamber of the corresponding forming mould 13 is connected to a vacuum pump. Under the effect of this differential pressure, the blank 11 is then applied to the walls of the forming mould 13 so that the finished product, for example a container 19, is obtained.

After raising the forming mould 13 from the blank mould 1, the supports 26 and 45 are rotated again. When the forming mould 13 retaining the finished article 19 by means of the vacuum obtaining in the chamber 16 is situated above the discharge chute 58, the chamber 16 is again connected to atmosphere or it is connected to a source of compressed air, so that the article 19 falls or is ejected into the discharge chute 58.

The distribution blank moulds on the support 26, of the forming moulds 13 on the support 45, the compression station 44, the vertical displacement station 48 and charging station 55 is such that a blank mould 1 is always beneath the compression station 44 and another blank mould 1 is beneath the charging station 55 while yet another blank mould 1 and a forming mould 13 are in alignment with the vertical displacement station 48. While one article is formed in a forming mould 13, a blank 11 is manufactured in the following blank mould 1. Obviously, the driving motor is stopped or disengaged from the shaft 28 during the compression of the blank and the moulding of the finished article.

The embodiment of apparatus as previously described is not limitative. The blank moulds 1 could be displaced along a rectilinear path and the rectilinear path of the forming moulds 13 could be perpendicular to the path of the blank moulds 1. The blank moulds 1, after formation of the finished article 19, would then be sent to the starting station situated ahead of the charging station 55.

It may be advantageous to provide several successive sections of the heating unit and to arrange a charging section for initial material at the inlet to each section and a compression station at the outlet from each section.

Similarly, in order to increase the rate of manufacture of the articles 19, it would be possible to multiply the blank moulds and the forming moulds so as to permit the simultaneous production of several blanks 11 and several finished articles 19. For this purpose it will be necessary to multiply in corresponding manner the number of compression stations, vertical displacement stations for the forming moulds and charging stations.

I claim:
1. Process for the manufacture of articles from plastic material, comprising the steps of:
 (a) introducing a starting material in a quantity exactly equal to that constituting the finished article into the cavity of an open shallow blank mold;
 (b) subjecting the starting material while in the open mold to a heat transfer treatment to bring said starting material to its plasticisation temperature to plasticise said material;
 (c) introducing a punch into the cavity of the blank mold against the plasticized material to effect compression thereof;
 (d) controlling the temperature of said punch and exhausting gases formed during the compression of said plasticised material so as to form a homogeneous blank in the form of a thin sheet;
 (e) retracting said punch;
 (f) positioning a forming mold over said homogeneous blank so as to maintain the edge of said homogeneous blank fixed between said blank mold and said forming mold;
 (g) establishing a pressure differential between the interior of said forming mold and the surface of said homogeneous blank adjacent said shallow blank mold so as to deform said homogeneous blank out of the blank mold against the interior surface of said forming mold to form an article of desired shape;

(h) retracting said forming mold from said blank mold such as to remove said article therefrom;

(i) cooling said article and ejecting said article from said forming mold.

2. Process as claimed in claim 1 wherein said step of exhausting gases comprises the step of venting said cavity of said shallow blank mold through said mold.

3. Process as claimed in claim 1 wherein said step of exhausting gases comprises the step of establishing a negative pressure in said cavity of said shallow blank mold through said shallow blank mold.

4. Process as claimed in claim 1 wherein said step of establishing a pressure differential between the interior of said forming mold and the surface of said homogeneous blank adjacent said forming mold comprises introducing positive pressurized fluid against said homogeneous blank through said shallow blank mold.

5. Process for the manufacture of articles from plastic material comprising the steps of:

(a) introducing, into the cavity of an open shallow blank mold, a plurality of starting materials in superposed layers, the quantity of said starting materials being exactly equal to that constituting a finished article;

(b) subjecting the starting materials while in the open mold to a heat transfer treatment to bring said starting materials to their plasticisation temperture to plasticise said materials;

(c) introducing a punch into the cavity against the plasticized materials to effect compression thereof;

(d) controlling the temperature of said punch and exhausting gases formed during the compression of said plasticised materials so as to form a homogeneous multi-layered complex blank in the form of a thin sheet;

(e) retracting said punch;

(f) positioning a forming mold over said homogeneous blank so as to maintain the edge of said homogeneous blank fixed between said blank mold and said forming mold;

(g) establishing a pressure differential between the interior of said forming mold and the surface of said homogeneous blank adjacent said shallow blank mold so as to deform said homogeneous blank out of the blank mold against the interior surface of said forming mold to form an article of desired shape;

(h) retracting said forming mold from said blank mold such as to remove said article therefrom; and (i) cooling said article and ejecting said article from said forming mold.

6. Process as claimed in claim 5 wherein each of said starting materials is introduced, heated to plasticisation and compressed to sequentially form said homogeneous blank in the form of a multi-layered thin sheet.

References Cited

UNITED STATES PATENTS

| | | | |
|---|---|---|---|
| 2,953,814 | 9/1960 | Mumford | 264—92 X |
| 3,159,695 | 12/1964 | Behringer | 264—92 X |
| 2,234,839 | 3/1941 | Edwards | 264—93 |
| 2,517,701 | 8/1950 | Oettinger | 264—92 |
| 2,978,376 | 4/1961 | Hulse | 264—92 |
| 3,140,325 | 7/1964 | Graff | 264—93 |
| 3,298,893 | 1/1967 | Allen | 264—97 X |
| 2,573,141 | 10/1951 | Heinrich | 264—102 |
| 2,911,678 | 11/1959 | Brunfeldt | 264—102 |

FOREIGN PATENTS 751,068  6/1956  Great Britain.

ROBERT F. WHITE, Primary Examiner

J. H. SILBAUGH, Assistant Examiner

U.S. Cl. X.R.

18—5, 19; 264—102